(12) United States Patent
Melchert et al.

(10) Patent No.: US 8,641,485 B2
(45) Date of Patent: Feb. 4, 2014

(54) MANUALLY OPERABLE CLIPPING-MACHINE

(75) Inventors: Uwe Melchert, Frankfurt (DE); Stephan Clößner, Ehringshausen Katzenfurt (DE); Jörg Sames, Alten Büseck (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 541 days.

(21) Appl. No.: 13/025,020

(22) Filed: Feb. 10, 2011

(65) Prior Publication Data

US 2011/0230128 A1 Sep. 22, 2011

(30) Foreign Application Priority Data

Feb. 10, 2010 (EP) .................................. 10 001 385

(51) Int. Cl.
*A22C 11/00* (2006.01)

(52) U.S. Cl.
USPC ......................................................... 452/48

(58) Field of Classification Search
USPC .................. 452/30–32, 35–37, 46–48, 51
See application file for complete search history.

(56) References Cited

U.S. PATENT DOCUMENTS

| | | | |
|---|---|---|---|
| 5,167,567 A | 12/1992 | Evans | |
| 6,705,063 B1 | 3/2004 | Töpfer et al. | |
| 7,325,380 B2 * | 2/2008 | Ebert | 53/417 |
| 7,604,531 B2 * | 10/2009 | Hanten | 452/48 |
| 7,618,307 B2 * | 11/2009 | Gladh | 452/51 |
| 7,926,689 B2 * | 4/2011 | Ebert et al. | 226/73 |
| 8,308,533 B2 * | 11/2012 | Haslacher | 452/32 |
| 2003/0005664 A1 | 1/2003 | Töpfer | |
| 2008/0220704 A1 | 9/2008 | Ebert et al. | |

FOREIGN PATENT DOCUMENTS

DE 20 2007 003 082 U1 8/2008

OTHER PUBLICATIONS

EP10001385.3-1260 Extended European Search Report dated Aug. 5, 2010, 6 pgs.

* cited by examiner

*Primary Examiner* — Richard Price, Jr.
(74) *Attorney, Agent, or Firm* — Hahn Loeser & Parks LLP

(57) ABSTRACT

The present invention concerns a manually operable clipping machine for producing sausage-shaped products. The machine comprises a first displacer unit with a first pair of upper and lower displacer elements, at least the upper displacer element is reversibly movable in a direction perpendicular to a longitudinal extending plait-axis between an opened and a closed position. The machine also comprises a second displacer unit with a second pair of upper and lower displacer elements, at least the upper displacer element is reversibly movable in a direction perpendicular to the longitudinal extending plait-axis between an opened and a closed position. The second displacer unit is reversibly movable parallel to the longitudinal extending plait-axis between a narrow position where the second displacer unit is adjacent to the first displacer unit, and a spread position in which the second displacer unit is moved away from the first displacer unit.

15 Claims, 4 Drawing Sheets

MANUALLY OPERABLE CLIPPING-MACHINE

This application claims priority to, and the benefit of, European Patent Application No. 10 001 385.3-1260, filed Feb. 10, 2010, which is hereby incorporated by reference.

BACKGROUND OF THE INVENTION

The present invention relates to a manually operable clipping machine for producing a plait-like portion on a tubular packaging casing.

In particular, the invention concerns a manually operable clipping machine for producing sausage-shaped products, for example sausages, with a plait-like portion on a tubular packaging casing which accommodates a filling material, in particular sausage meat, wherein the plait-like portion is at least approximately free of filling material and comprises a longitudinal extending plait-axis. The clipping machine comprises a first displacer unit with a first pair of upper and lower displacer elements wherein at least the upper displacer element is reversibly movable in a direction perpendicular to the longitudinal extending plait-axis between an opened and a closed position. Thereby, the opened position is the maximum displacement between the upper and lower displacer elements and the closed position is the minimum position between the upper and lower displacer elements. Beyond that, the clipping machine comprises a second displacer unit with a second pair of upper and lower displacer elements wherein also at least the upper displacer element is reversibly movable in a direction perpendicular to the longitudinal extending plait-axis between an opened and a closed position. Thereby, the opened position is the maximum displacement between the upper and lower displacer elements and the closed position being the minimum position between the upper and lower displacer elements. Furthermore, the second displacer unit is reversibly movable parallel to the longitudinal extending plait-axis between a narrow position in which the second displacer unit is adjacent to the first displacer unit, and a spread position in which the second displacer unit is moved away from the first displacer unit. Also, the clipping machine comprises closing means for fitting at least one clip onto the plait-like portion.

In sausage production, it is possible to use, for example, a manually operable clipping-machine for closing the ends of a sausage-shaped product (in the following, the expression "sausage-shaped" is equivalent to the term "sausage-like"). Thereby, a tubular casing made from a flexible sheet-like packaging material is filled with sausage meat via a filling tube wherein the tubular casing is closed by a closure means, referred to as a closing clip, at its front end, i.e. the end being directed in the feeding direction of the filling material.

These manually operable clipping-machines are usually equipped with a hand-lever with which the user can operate displacer units of the clipping-machine, i.e. open and close the displacer units. The displacer units are used for producing a gathered plait-like portion which is at least approximately free of filling material, after the filling operation is concluded, a gathered plait-like portion. Two clips are then applied to the plait-like portion, a first closing clip in order to close the second or back end of the just filled sausage product and a second closing clip in order to close the first or front end of the subsequent sausage product. Thereafter, said plait-like portion is severed between said two set clips creating one complete sausage product and a tubular casing for the next sausage product to be filled is closed at its front end. Such a practice for producing sausages is disclosed, for example, by U.S. Pat. No. 4,807,345 or 4,827,591.

Within the typical sausage production, different types of sausage products can be produced. These different types of sausage products are typically characterized by different calibers, i.e. the actual diameter of the sausage product, overall length, specific kind of the filling material as well as packaging casing material etc. Also, the physique of the operators who are potentially using the clipping-machine, can differ in a great amount. There are, for example, taller and stronger or smaller and weaker operators. The variety of these operators can span from being very small and weak to very tall and strong. So far, none of the prior art manually operable clipping-machines can be adapted in an appropriate manner, in order to suit these different characteristics of the different sausage products and/or operators. Running a manually operable clipping-machine which is not set-up to the appropriate conditions, can mean a very inefficient and even costly production.

BRIEF SUMMARY OF THE INVENTION

The object of the present invention is to solve the above described problem. In particular, it is the object of the present invention to provide a manually operable clipping machine for producing a plait-like portion on a tubular packaging casing, with which a quick and easy adaption of the machine to the individual operating and production conditions can be achieved and a more efficient and less costly production of sausage-shaped products can be obtained.

In particular, the above object is solved by a manually operable clipping machine for producing sausage-shaped products, for example sausages, with a plait-like portion on a tubular packaging casing which accommodates a filling material, in particular sausage meat, wherein the plait-like portion is at least approximately free of filling material and comprises a longitudinal extending plait-axis. The manually operable clipping machine comprises a first displacer unit with a first pair of upper and lower displacer elements wherein at least the upper displacer element is reversibly movable in a direction perpendicular to the longitudinal extending plait-axis between an opened and a closed position. Thereby, the opened position is the maximum displacement between the upper and lower displacer elements and the closed position is the minimum position between the upper and lower displacer elements. Beyond that, the a manually operable clipping machine comprises a second displacer unit with a second pair of upper and lower displacer elements wherein also at least the upper displacer element is reversibly movable in a direction perpendicular to the longitudinal extending plait-axis between an opened and a closed position. Thereby, the opened position is the maximum displacement between the upper and lower displacer elements and the closed position being the minimum position between the upper and lower displacer elements. Furthermore, the second displacer unit is reversibly movable parallel to the longitudinal extending plait-axis between a narrow position in which the second displacer unit is adjacent to the first displacer unit, and a spread position in which the second displacer unit is moved away from the first displacer unit. Also, the manually operable clipping machine comprises closing means for fitting at least one clip onto the plait-like portion.

According to the present invention, it is proposed that the manually operable clipping machine comprises an adjustment assembly for adjusting the position of at least the upper displacer elements of the first and second displacer units in the opened position. Adjusting the opened position of the upper displacer elements depending on the caliber of the to-be-produced sausage-shaped product optimizes the expenditure of time and energy during the production process.

It is advantageous that the adjustment assembly comprises an abutment unit including an abutment element which is adjustable in a direction at least somehow perpendicular to the plait-axis. It is favorable that the abutment element comprises some kind of elastic shock absorber element, like a rubber stopper or a spring. The abutment element functions as a stopper for the upper displacer elements and restricts or widens the moving distance of the upper displacer elements of the displacer units. The abutment element can be moved in a direction at least approximately perpendicular to the plait-axis. By adjusting the abutment unit, also the opened position of the upper displacer elements can easily be adjusted.

It is also possible that the adjustment assembly comprises a counter-abutment unit including a counter-abutment element which is connected to the upper displacer elements. It is possible that the counter-abutment element, which can be in form longitudinal rod, posses some damping characteristics. The counter-abutment unit may form some kind of an adaption between the abutment unit and the upper displacer elements.

It is also advantageous that the counter-abutment unit and the upper displacer elements are adapted for being moved together, in order to transfer their motions to each other.

As the upper displacer elements can move in a pivoting motion and the counter-abutment element can linearly be guided to move only in a linear motion at least somehow perpendicular to the plait-axis, it is favorable that the upper displacer elements and the counter-abutment element are coupled by an interconnected joint mechanism. The interconnected joint mechanism which can be in form of a connecting rod or something equivalent, is able to compensate the different types of motion of the upper displacer elements and the counter-abutment element, so that they are able to move together, i.e. the pivoting motion of the upper displacer elements can be transformed into the linear motion of the counter-abutment element, and vice versa.

For ensuring the linear motion of the counter-abutment element, it is also favorable that the counter-abutment element is linearly guided.

It is also possible that the adjustment assembly comprises a reset-mechanism having a reset-element and which is acting on the counter-abutment element, in order to facilitate the return of the displacer units in the opened position after they have been pushed in the closed position. The reset-element can have many forms and shapes and should be able to store and release energy, e.g. mechanical energy like a spring. However, it is also possible that the reset-mechanism is in form of an internally driven mechanism, e.g. a motor or actuator of some kind. In a preferred embodiment, the reset-mechanism by means of the reset-element can act on the upper displacer elements. However, it is also possible that the reset-mechanism with the reset-element could act on the counter-abutment element.

It is advantageous that the adjustment assembly comprises a first and/or second initiator or sensor of some kind. The first initiator can be firmly connected to the abutment unit and is able to detect if the upper displacer elements are at least in the region of the opened position. Also, a second initiator can be firmly connected to a machine frame can be able to detect if the upper displacer elements are at least in the region of the closed position.

Furthermore, the manually operable clipping machine can also comprise a marker or something similar, which immediate presence can be detected by the initiators. The marker can, for example, be made out of some kind of metal and the initiators can be in form of metal detectors or photo sensor. The marker can be firmly connected somewhere at the counter-abutment unit or preferably at the counter-abutment element. As the counter-abutment element can be moved in a linear motion driven by the upper displacer units, the marker is also moved linearly at the same amount as the counter-abutment element. The marker is able to activate the first and/or second initiators, when it is brought close to them. Hence, the first and/or second initiators can be activated by the marker, which is able to indicate if the upper displacer elements are at least in the region of the opened position and if the upper displacer elements are at least in the region of the closed position. It is possible that the marker is firmly connected to the counter-abutment element, which again is coupled to the upper displacer elements. By doing so, successive processes, such as, for example the pumping of filling material, can be started or stopped at an earlier time, in order to save time and shortening the total manufacturing process.

In order to analyse and interpret the signals coming from the first and/or second initiators, in a preferred embodiment, a control unit can be connected to the first and second initiators. In that case, the signals of the initiators can be used to control or at least aid to control further operations within the sausage production process, such as the pump for forward motion of the filling material, the closing means for setting closing means, e.g. clips or the cutting tools for cutting through the plait-like portion.

Until now, prior art manually operable clipping machines are only able to perform their specific operations in a strict consecutive manner. That means that, only after one operation has been completely finished, such as opening the displacer elements, the next operation, e.g. severing the plait-like portion, can be started. By doing so, the total processing time is unnecessarily increased. In contrast to the prior art, the present invention enables the separate operations to merge, so that successive operations can already be started while previous operations are not yet completely finished.

For the purpose of manually operating the clipping machine and in particular the upper displacer units, it is further advantageous that the manually operable clipping machine comprises a hand lever for operating at least the upper displacer elements, wherein the hand lever is adjustable in its length. That means that the length of the hand lever can be extended approximately perpendicular to the plait-axis.

In order to operate at least the upper displacer elements, the hand lever can be connected with its first end to the upper displacer elements, the second end can comprise a handle. Moreover, the hand lever may have a telescopic shaft which is adjustable in its length. It is also advantageous that the hand lever comprises a restraint system, in order to lock the telescopic shaft of the hand lever firmly in a certain position. It is preferably that the restraint system can be operated from the second end of the hand lever, for example by turning the said end of the hand lever.

In order to adapt the length of the hand lever to the specific sausage production conditions, the length of the hand lever can be decreased or increased. In order to vary the length of the hand lever, the restraint system needs to be loosened, so that it is possible to elongate or shorten the length of the hand lever by pulling or pushing the telescopic shaft of the hand lever. After the length has been adjusted the restraint system can then be locked again for keeping the length of the hand lever at that specific length. In order to provide a restraint system which can easily be locked and loosened, the restraint system can comprise a longitudinal pin and an arresting device. It can be favorable that the arresting device comprises an elastically deformable arrestor which can be in form of a piece of rubber or something equivalent and is able to slide inside the shaft of the hand lever.

It is also possible to use the inventive hand lever separately from the adjustment assembly and just on its own. In the same sense, it is also possible to use the adjustment assembly separately from the inventive hand lever and on its own, too.

Other advantages and one embodiment of the present invention shall now be described with reference to the attached drawings. The terms "top", "bottom", "left" and "right" used when describing the embodiment, relate to the drawings orientated in such a way that the reference numerals and name of the figures can be read normally.

DETAILED DESCRIPTION OF THE INVENTION

The embodiment of a manually operable clipping-machine according to the invention and described in the following, is used in the production of sausages. The inventive machine may also be used, of course, in the production of sausage-shaped products that do not include foodstuffs, but, for example, sealing compounds or adhesives.

Figure 1:
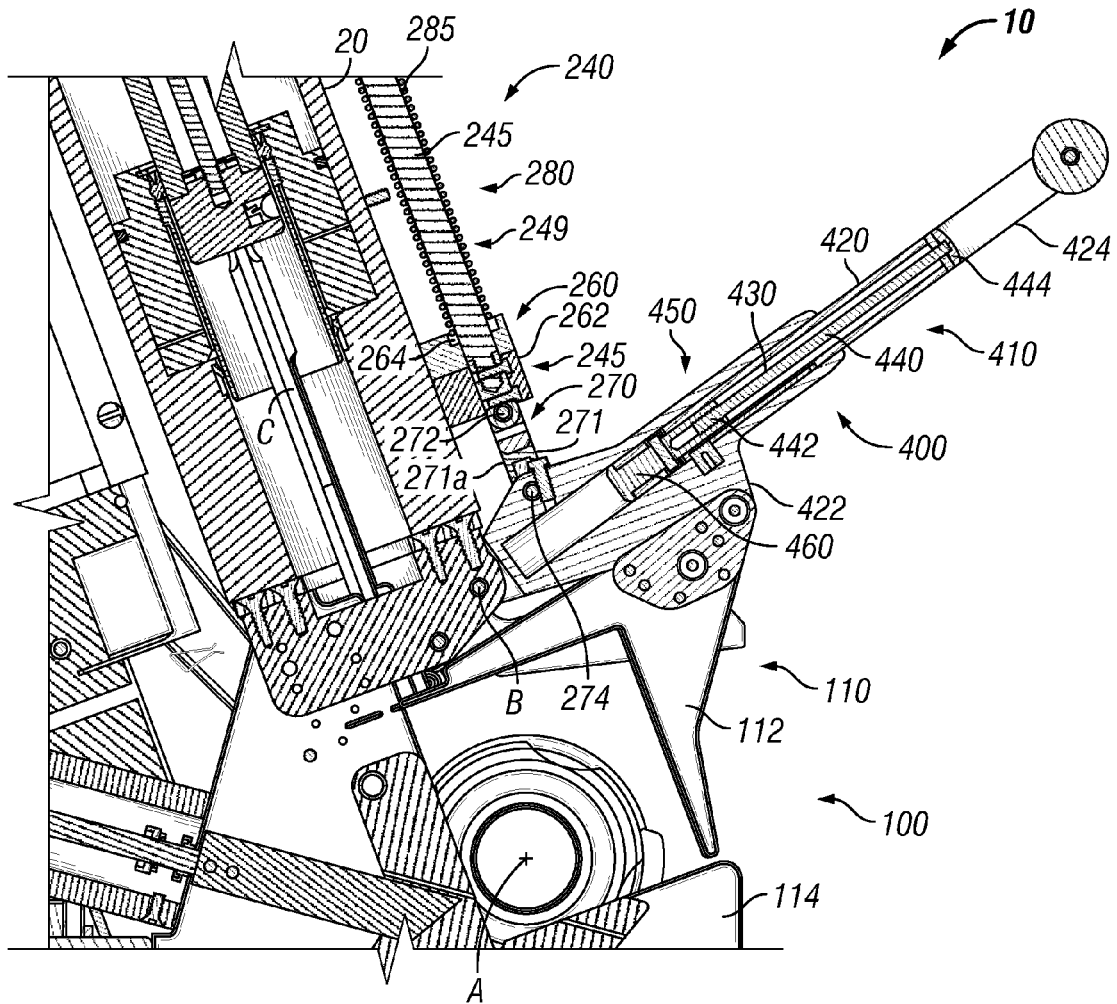
FIG. 1 discloses a sectioned side view of an inventive clipping machine having a hand lever, an upper displacer unit, the lower end of an adjustment assembly.

According to a preferred embodiment of the present invention, FIG. 1, viewed in the direction of the longitudinal extending plait-axis A of a not shown sausage-shaped product to be produced, for example a sausage shows a sectioned view of a part of the manually operable clipping machine 10 which comprises three main assemblies, namely a displacer assembly 100, an adjustment assembly 200, a hand lever assembly 400 as well as closing means C.

Figure 4:
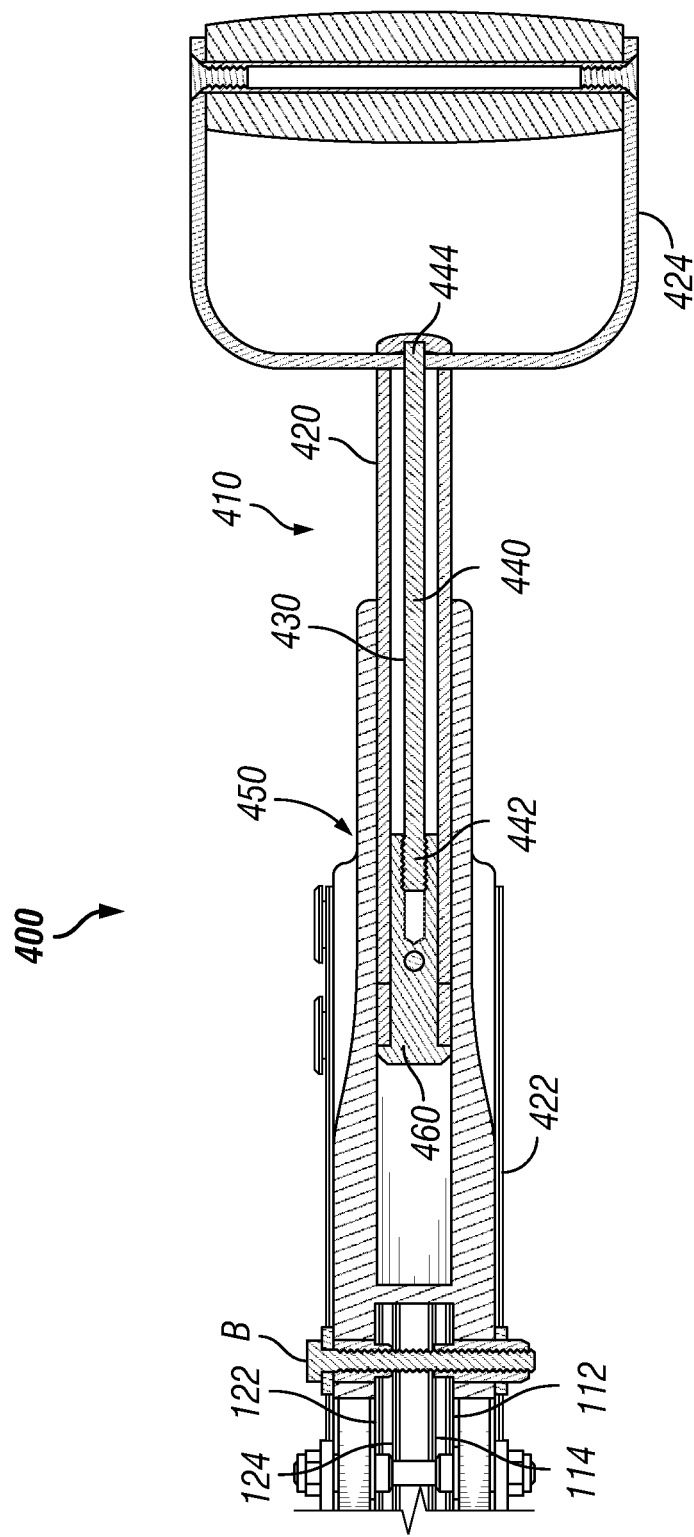
FIG. 4 shows a top view of the hand lever and details of the restraint system.

The displacer assembly 100 comprises a first and a second displacer unit 110, 120 which are arranged in the direction of longitudinal axis A one after the other so that only the front displacer unit 110 can be seen in FIG. 1. Both displacer units 110, 120 have each upper and lower displacer elements 112, 114 (the two displacer units 110, 120 with their both pairs of displacer elements 112, 114 and 122, 124 are shown in FIG. 4).

The upper displacer elements 112, 122 can be arranged to be movable around a displacer element axis B. The lower displacer elements 114, 124 are fixed to a machine frame 20 of clipping machine 10. Therefore, the lower displacer elements 114, 124 are stationary and not pivotable. However, it is also possible that the lower displacer elements can be arranged to be movable as well. Furthermore, it is also possible that no spread-movement at all is intended for the displacer elements, as it is intended in this particular embodiment. The upper and lower displacer elements 112, 114, 122, 124 are positioned to each other like a scissor.

Figure 2:
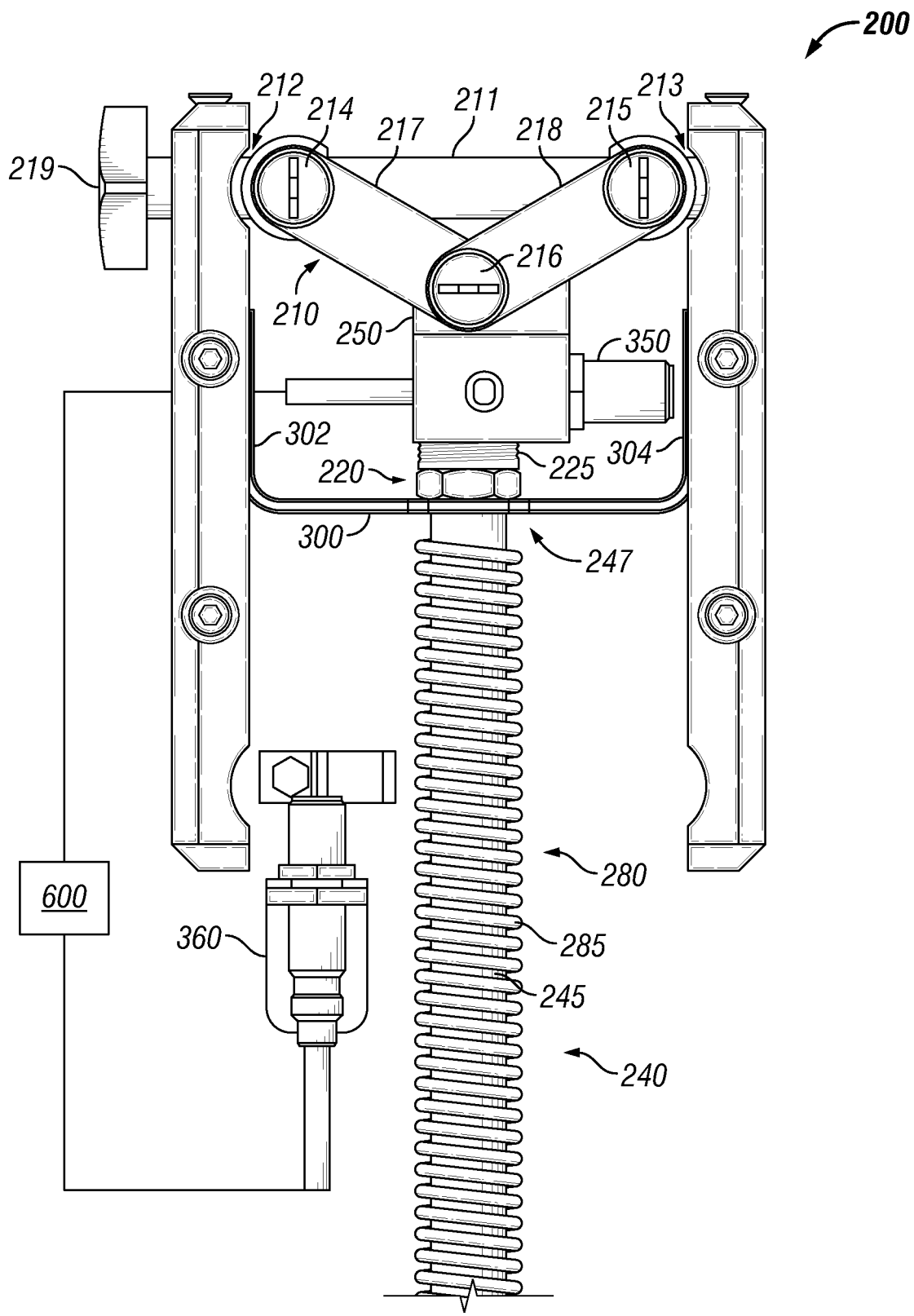
FIG. 2 shows a detailed view of the upper end of the adjustment assembly partially shown in FIG. 1.

The adjustment assembly 200, the upper end of which is shown in FIG. 2, comprises an adjustment mechanism 210 as its main component, an abutment unit 220 which comprises an abutment element 225 in form of an elastic stopper element, and a counter-abutment unit 240 comprising a counter-abutment element 245, in form of a longitudinal bar and being shown in FIG. 1.

As shown in FIG. 2, the adjustment mechanism 210 is constructed in form of a knee lever which is able to transform a circular motion into a linear motion. In particular, the adjustment mechanism 210 comprises an adjustment bar 211 in form of a horizontally arranged rod with a first end 212 and a second end 213. The centre line of the adjustment bar 211 lies parallel to the plait-axis A. The adjustment bar 211 is linked via a right-hand thread (not shown) at its first end 212 to a left adjustment joint 214 which is functioning as a lead screw nut. Also, the adjustment bar 211 is linked via a left-hand thread (not shown) at its second end 213 to a right adjustment joint 215 which is also functioning as a lead screw nut. The left connecting link 217 is pivotably linked with a first end to the left adjustment joint 214 and with a second end to a centre adjustment joint 216. Furthermore, the right connecting link 218 is pivotably linked with a first end to the right adjustment joint 215 and with a second end to the centre adjustment joint 216. Therefore, the adjustment bar 211, the left connecting link 217 and the right connecting link 218 are forming a triangle. A hand wheel 219, for manually operating the adjustment assembly 200, is connected at the first end 212 of the adjustment bar 211. The centre adjustment joint 216 is pivotable coupled to an attachment 250, which is positioned underneath the centre adjustment joint 216, i.e. in the direction towards the plait-axis A.

Moreover, as also shown in FIG. 2, the adjustment assembly 200 comprises a marker 300 which is in form of a bow, and which is firmly connected to the upper end 247 of the counter-abutment element 245. The U-shaped marker 300 is arranged symmetrically at the upper end 247 of the counter-abutment unit 240 with its left and right legs 302, 304 extending upright in a plane parallel to the plait-axis A.

Furthermore, FIG. 2 illustrates that the adjustment assembly 200 also comprises a first initiator 350 which may be in form of a photo sensor or something likewise, and which is firmly linked to the attachment 250 and positioned in such a way that it, according to the embodiment of FIG. 2, can detect the presence of the right leg 304 of the marker 300. The adjustment assembly 200 also comprises a second initiator 360 which may also be in form of a photo sensor or something likewise and which is firmly connected to the machine frame 20 of the clipping machine 10 and positioned in such a way that it can detect the presence of the left leg 302 or the bottom of the U-shaped marker 300. Both initiators 350, 360 are linked to a control unit 600 which is positioned somewhere within the clipping machine 10 and which is able to evaluate and process the signals and data send by the initiators 350, 360. By detecting the presence of the left and right leg 302, 304 of the marker 300, the first and second initiators 350, 360 are able to detect if the counter-abutment unit 240 together with the counter-abutment element 245 is either in the upper position, i.e. away from the plait-axis A, or in a lower position, i.e. close to the plait-axis A, as the marker is firmly connected to upper end 247 of the counter-abutment unit 240.

As it can be inferred from FIG. 1, the counter-abutment unit 240 comprises the counter-abutment element 245 in form of a longitudinal cylindrical rod arranged perpendicular to the plait-axis A, having an upper end 247 (as shown in FIG. 2) and a lower end 249. Moreover, the counter-abutment unit 240 includes further a linear guide 260 for the counter-abutment element 245 and a reset-mechanism 280. The reset-mechanism 280 comprises a reset-element 285. The reset-element 285 can be in numerous forms of a device for storing energy and in particular mechanical energy. In this particular embodiment, the reset-element 285 is in form of a spring which is arranged coaxial to the counter-abutment element 245 and embracing the counter-abutment element 245. The linear guide 260 comprises a bracket 262 being connected to the frame 20 of the clipping-machine 10 and a notch 264 at the upper side of the bracket 262. The bracket 262 comprises a hole through which the counter-abutment element 245 is extending through. As it is shown in FIG. 2, the reset-element 285 is firmly connected with its upper end to the upper end 247 of the counter-abutment element 245. The lower end 249 of the reset-element 285 rests in the notch 264.

The hand lever assembly 400 is connected by an interconnected joint mechanism 270. The interconnected joint mechanism 270 comprises a first pin 272 running through the lower end 249 of the counter-abutment unit 240 parallel to the plait-axis A and a second pin 274 running through the first end 422 of the hand lever 410 also parallel to the plait-axis A as well as a two-piece connecting rod 271 which is connecting the first pin 272 with the second pin 274. The connecting rod 271 comprises a front piece (not shown) and a rear piece 271a. The front piece and the rear piece 271a are arranged one after the other in direction parallel to the plait-axis A, so that they are fitted on either ends, i.e. the front end and the rear end, of the first pin 272 and second pin 274, in order to enclose the interconnected joint mechanism 270 between them.

As it can be inferred from FIG. 1, the hand lever assembly 400 is positioned approximately between the displacer assembly 100 and the adjustment assembly 200.

Also, as shown in FIG. 1, the hand lever assembly 400 comprises a hand lever 410. The hand lever 410 has a first end 422 which is proximal to the clipping machine 10, and a second end 424 which is distal to the clipping machine 10. The first end 422 of the hand lever 410 is connected to the first and second upper displacer elements 112, 122, as it is also shown in FIG. 4. Also, the first end 422 of the hand lever 410 is coupled to the counter-abutment unit 240 by means of an interconnected joint mechanism 270.

Figure 3:
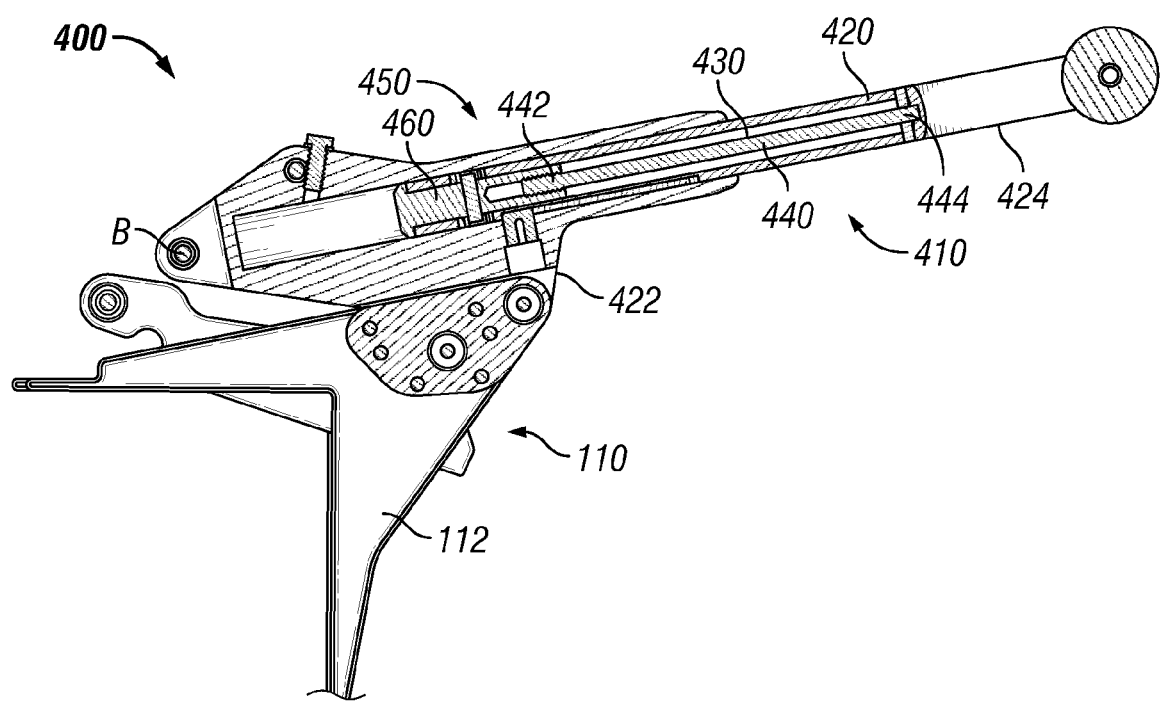
FIG. 3 discloses a side view of the hand lever shown in FIG. 1, together with an upper displacer element and details of a restraint system.

FIG. 3 illustrates a side view of the hand lever 410 together with upper displacer element 112 and details of a restraint system 430 of said hand lever 410. As it can be taken from FIGS. 1 and 3, the hand lever 410 extends in plane perpendicular to the plait-axis A and is connected with its first end 422 to the upper side of the first and second upper displacer elements 112, 122 (as shown in FIG. 4). The first and second upper displacer elements 112, 122 are also extending in a plane perpendicular to the plait-axis A and are pivotally mounted to rotate around the displacer element axis B (as shown in FIGS. 1 and 3), in order to be moved by the manually operated hand lever 410 between an opened and closed position. Thereby, the opened position is the maximum displacement between the upper and lower displacer elements 112, 114, 122, 124 and the closed position being the minimum position between the upper and lower displacer elements 112, 114, 122, 124. FIG. 1 is showing the opened position of the upper displacer elements 112, 122.

Moreover, as shown in FIGS. 1, 3 and 4, the hand lever 410 comprises a longitudinal telescopic shaft 420 as well as a handle positioned at the second end 424 of the hand lever 410 distal to the clipping machine 10. The length of the shaft 420 can be increased or decreased by pulling or respectively pushing the shaft 420, in order to alter the length of the hand lever 410. A restraint system 430 for locking the shaft 420 at a specific length is located inside the shaft 420. The restraint system 430 comprises a longitudinal pin 440 extending congruent with the centre line of the shaft 420 and thereby perpendicular to the plait-axis A. The longitudinal pin 440 comprises a first end 442 and a second end 444. The first end 442 is linked to an arresting device 450 which comprises an elastically deformable arrestor 460 in form of a piece of rubber or something equivalent. The second end 444 reaches up to and is firmly connected to the second end 424 of hand lever 410. The restraint system 430, and in particular the arresting device with the arrestor 460, is operated by the second end 444 of the longitudinal pin 440.

For the purpose of producing a plait-like portion which is at least approximately free of filling material, on a tubular packaging casing accommodating a filling material, the hand lever 410 is being pulled downwards from its resting position shown in FIG. 1, in order to move the upper displacer elements 112, 122 from their opened position shown in FIG. 1, to their closed position. When the upper displacer elements 112, 122 are in their closed position, i.e. when they are relative close to the lower displacer elements 114, 124, the flexible packaging casing is being gathered so that all or at least approximately all filling material is being pushed aside. After that, the closed displacer units 110, 120 can be spread apart producing a plait-like portion. However, in this particular embodiment, the closed displacer unit 110, 120 are not being spread apart. In order to seal off the ends of the plait-like portion, one or two clips (not shown) are being positioned on either ends of the plait-like portion with the aid of closing means C. By doing so, a first sausage product is completed and the first clip for the next sausage product is set in place.

After the upper displacer elements 112, 122 have reached their closed position the reset-mechanism 280 of the counter-abutment unit 240 by means of the reset-element 285 in form of a spring is automatically returning the upper displacer elements 112, 122 back to the opened position shown in FIG. 1. As the spring 285 is being compressed when the upper displacer elements 112, 122 are in their closed position, the spring 285 is then expanding again whereby pulling the upper displacer elements 112, 122 together with the hand lever 410 upwards and back into their opened position.

The opened position of the upper displacer elements 112, 122 is defined by the position of the abutment unit 220, at which the upper end 247 of the counter-abutment element 245 abuts upon.

The position of the abutment unit 220 can be altered, i.e. lowered towards the plait-axis A or raised away from the plait-axis A, by the adjustment mechanism 210. By turning the hand wheel 219 in one direction, the left-hand and right-hand threads (not shown) at either ends of the adjustment bar 211 are moving the left and right adjustment joints 214, 215 either towards to each other or away from each other. When the left and right adjustment joints 214, 215 are being moved towards to each other, the position of the left and right connecting links 217, 218 are becoming steeper and thereby pushing attachment 250 and together with it the abutment unit 220 downwards, i.e. in a direction towards the plait-axis A. As the abutment unit 220 is being lowered, the upper end 247 of the counter-abutment element 245 abuts on the abutment unit 220 also in a deeper position, so that consequently the opened position of the upper displacer elements 112, 122 is also lower. When the left and right adjustment joints 214, 215 are being moved away from each other, the reversed movement of attachment 250 and abutment unit 220 occurs.

In order to be able to produce large calibered sausage, which can be transported along the clipping machine 10 without touching or colliding with machine parts, the opened position of the upper displacer elements 112, 122 is increased by opening the first and second displacer units 110, 120 widely leaving enough space for the large calibered sausage product. In the case of manufacturing small calibered sausage products, the opened position of the upper displacer elements 112, 122 can be lower, whereby the first and second displacer units 110, 120 do not open too far leaving only enough space for the small calibered sausage product to pass the machine parts without touching or colliding with them.

When the manually operated clipping machine 10 is in use, filling material, such as sausage meat, is being pumped from a container through the filling pipe into the tubular packaging casing (not shown). The pressure of the filling material is pushing the packaging casing forward until the desired length of the to-be produced sausage product is reached, then the operator is pulling the hand lever 410, in order to move the upper displacer elements 112, 122 from their opened position into their closed position for producing the plait-like portion. When the upper displacer elements 112, 122 are being moved into their closed position by the hand lever 410, the marker 300 is also being moved downwards as it is firmly connected to the counter-abutment element 245, which is also moved downwards as the clipping machine 10 is in operation.

When the upper displacer elements 112, 122 are in the region of their closed position, the marker 300 is pulled down by the counter-abutment element 245, so that the second initiator 360 can detect the presence of the marker 300 in a lower position and thereby determine that the upper displacer elements 112, 122 are in their closed position. When the second initiator 360 detecting the marker 300, it is sending out a signal to the control unit 600, in order to indicate that the upper displacer elements 112, 122 are in the region of their closed position. As the second initiator 360 detects when the upper displacer elements 112, 122 are already in the region of their closed position, i.e. some distance before the actual closed position has been reached, it is possible to initiate other processes, such as setting the clips or cutting through the plait-like portion, at an early point and thereby saving time and shortening the entire production process.

When one or two clips have been set and the plait-like portion has been cut through, the upper displacer elements 112, 122 are being brought back into their opened position driven by the restraint mechanism 280. When the upper displacer elements 112, 122 are being moved upwards, the counter-abutment element 245 and the marker 300 are also being moved upwards accordingly. The upper position of the upper end 247 of the counter-abutment element 245 is being detected by the first initiator 350, as it detects the presence of the right leg 304 of the marker 300. As soon as the right leg 304 is coming close to the first initiator 350, i.e. into its detecting range, a signal is sent by the first initiator 350 to the control unit 600, in order to indicate that the upper displacer elements 112, 122 are within the region of their opened position. The signal sent out to the control unit 600 by the first initiator 350 indicates the clipping machine 10 that the plait-like portion on the sausage products has been produced and that the tubular packing casing (not shown) can be moved along in direction of the plait-axis 10, in order to start the filling process for the next sausage product. As the first initiator 350 detects when the upper displacer elements 112, 122 are already in the region of their opened position, i.e. some distance before the actual opened position, it is possible to initiate the filling process for next sausage product at an early point and thereby saving time and shortening the entire production process.

Additionally, as the opened position of the upper displacer elements 112, 122 can be altered by raising or lowering the abutment unit 220 depending on the caliber of the sausage product which is to be produced, the length of the shaft 420 of the hand lever 410 may be altered respectively, in order to adapt the leverage of the hand lever 410 to the particular sausage product and its parameters.

The length of the telescopic shaft 420 of the hand lever 410 can be altered by pulling or pushing at the second end 424 of the hand lever 410. In order to do so, the restraint system 430 needs to be unlocked first of all for letting the telescoped components slide freely against each other. In order to secure the length of the shaft 420 at a particular length, the shaft 420 can be locked by means of the restraint system 430. The elastically deformable arrestor 460 which is in form of a rubber stopper, is able to slide within the shaft 420 in its normal formation. However, when the arrestor 460 is being compressed, its height is becoming smaller as its diameter is becoming larger, so that it cannot slide inside the shaft 420 anymore, but presses against the inside walls of the shaft 420 and thereby locking the shaft 420 at a particular length. The arrestor 460 is deformed, in order to lock or unlock the shaft 420 at a specific length, when the longitudinal pin 260 is being turned at its second end 444.

According to the present invention, it is possible to easily adapt the opened position of the upper displacer elements 112, 122 and the length of the hand lever 410, in order to adjust the manually operable clipping-machine 10 to the specific conditions and parameters of the to-be produced sausage products. The adjustment of the opened position of the upper displacer elements 112, 122 and the length of the hand lever 410 may even be done during the on-going production without having to stop the sausage product manufacturing process. The opened position of the upper displacer elements 112, 122 and the length of the hand lever 410 can be increased, if, for example, a sausage product with a large caliber is to be produced, in order to leave enough space for the large calibered sausage product not to collide with the displacer units 110, 120 or other machine parts and also to adapt the length of the hand lever 410 to provide the required leverage.

LIST OF REFERENCES

10 Clipping machine
20 Frame of clipping-machine
100 Displacer assembly
110 First displacer unit
112 First upper displacer element
114 First lower displacer element
120 Second displacer unit
122 Second upper displacer element
124 Second lower displacer element
200 Adjustment assembly
210 Adjustment mechanism
211 Adjustment bar
212 First end of adjustment bar
213 Second end of adjustment bar
214 Left adjustment joint
215 Right adjustment joint
216 Centre adjustment joint
217 Left connecting link
218 Right connecting link
219 Hand wheel
220 Abutment unit
225 Abutment element
240 Counter-abutment unit
245 Counter-abutment element
247 Upper end of counter-abutment element
249 Lower end of counter-abutment element
250 Attachment
260 Linear guide
262 Bracket
264 Notch 270 Interconnected joint mechanism
271 Connecting rod
271a Rear piece of connecting rod
272 First pin
274 Second pin
280 Reset-mechanism
285 Reset-element
300 Marker
302 Left leg of marker
304 Right leg of marker
350 First initiator
360 Second initiator
400 Hand lever assembly
410 Hand lever
420 Shaft
422 First end of hand lever
424 Second end of hand lever
430 Restraint system
440 Longitudinal pin
442 First end of the longitudinal pin
444 Second end of the longitudinal pin
450 Arresting device
460 Arrestor
600 Control unit
A plait-axis
B Displacer element axis
C Closing means

The invention claimed is:

1. A manually operable clipping-machine for producing sausage-shaped products with a plait-like portion on a tubular packaging casing accommodating a filling material, wherein the plait-like portion is at least approximately free of filling material and comprises a longitudinal extending plait-axis, comprising:
   a first displacer unit with a first pair of upper and lower displacer elements wherein at least the upper displacer element is reversibly movable in a direction perpendicular to the longitudinal extending plait-axis between an opened and a closed position, with the opened position being the maximum displacement between the upper and lower displacer elements and the closed position being the minimum position between the upper and lower displacer elements,
   a second displacer unit with a second pair of upper and lower displacer elements wherein at least the upper displacer element is reversibly movable in a direction perpendicular to the longitudinal extending plait-axis between an opened and a closed position, with the opened position being the maximum displacement between the upper and lower displacer elements and the closed position being the minimum position between the upper and lower displacer elements, and wherein the second displacer unit is being further reversibly movable parallel to the longitudinal extending plait-axis between a narrow position in which the second displacer unit is adjacent to the first displacer unit, and a spread position in which the second displacer unit is moved away from the first displacer unit,
   closing means for fitting at least one clip onto the plait-like portion, and
   an adjustment assembly for adjusting the position of at least the upper displacer elements of the first and second displacer units in the opened position.

2. The manually operable clipping-machine according to claim 1, further comprising:
   an abutment unit including an abutment element which is adjustable in a direction perpendicular to the plait-axis.

3. The manually operable clipping-machine according to claim 1,
   wherein the adjustment assembly comprises a counter-abutment unit including a counter-abutment element which is connected to the upper displacer elements.

4. The manually operable clipping-machine according to claim 3, wherein the counter-abutment unit and the upper displacer elements are adapted for being moved together.

5. The manually operable clipping-machine according to claim 3,
   wherein the counter-abutment unit is coupled to the upper displacer elements by an interconnected joint mechanism.

6. The manually operable clipping-machine according to claim 3,
   wherein the counter-abutment element is linearly guided.

7. The manually operable clipping-machine according to claim 1,
   wherein the displacer assembly comprises a reset-mechanism having a reset-element and which is acting on at least the upper displacer elements.

8. The manually operable clipping-machine according to claim 1,
   wherein the adjustment assembly comprises a reset-mechanism having a reset-element and which is acting on the counter-abutment element.

9. The manually operable clipping-machine according to claim 1,
   wherein the adjustment assembly comprises a first initiator which is firmly connected to the abutment unit and is able to detect if the upper displacer elements are at least in the region of the opened position.

10. The manually operable clipping-machine according to claim 1,
    wherein the adjustment assembly comprises a second initiator which is firmly connected to a machine frame and able to detect if the upper displacer elements are at least in the region of the closed position.

11. The manually operable clipping-machine according to claim 9,
    wherein the first and/or second initiators are activated by a marker which is able to indicate if the upper displacer elements are at least in the region of the opened position and if the upper displacer elements are at least in the region of the closed position.

12. The manually operable clipping-machine according to claim 1, further comprising:
    a hand lever for operating at least the upper displacer elements, wherein the hand lever is adjustable in its length.

13. The manually operable clipping-machine according to claim 12, wherein the hand lever having a first and second end is connected to the upper displacer elements by its first end.

14. The manually operable clipping-machine according to claim 12,
    wherein the hand lever comprises a restraint system being operable from the second end of the hand lever for locking the shaft at a specific length.

15. The manually operable clipping-machine according to claim 14,
    wherein the restraint system comprises a longitudinal pin and an arresting device having an elastically deformable arrestor slidable inside the shaft, wherein the longitudinal pin is operatively connected to the arresting device.

* * * * *